(12) United States Patent
Wu et al.

(10) Patent No.: US 11,037,357 B2
(45) Date of Patent: *Jun. 15, 2021

(54) PIXELATION OPTIMIZED DELTA COLOR COMPRESSION

(71) Applicants: Advanced Micro Devices, Inc., Santa Clara, CA (US); ATI Technologies ULC, Markham (CA)

(72) Inventors: Ruijin Wu, La Jolla, CA (US); Skyler Jonathon Saleh, La Jolla, CA (US); Christopher J. Brennan, Boxborough, MA (US); Kei Ming Kwong, Markham (CA); Anthony Hung-Cheong Chan, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/706,308

(22) Filed: Dec. 6, 2019

(65) Prior Publication Data

US 2020/0111248 A1 Apr. 9, 2020

Related U.S. Application Data

(63) Continuation of application No. 16/023,387, filed on Jun. 29, 2018, now Pat. No. 10,529,118.

(51) Int. Cl.
*G06T 15/00* (2011.01)
*G06T 7/90* (2017.01)
*G06T 9/00* (2006.01)

(52) U.S. Cl.
CPC .............. *G06T 15/005* (2013.01); *G06T 7/90* (2017.01); *G06T 9/00* (2013.01); *G06T 2207/10024* (2013.01)

(58) Field of Classification Search
CPC ....... G06T 15/506; G06T 15/50; G06T 15/60; G06T 15/80; G06T 15/06; G06T 9/00; H04N 7/26; G09G 2360/125; G09G 5/39; G09G 5/393
See application file for complete search history.

(56) References Cited

U.S. PATENT DOCUMENTS

| | | | | |
|---|---|---|---|---|
| 7,127,104 B2 * | 10/2006 | Prasad | ............... | G06K 9/00818 382/164 |
| 10,529,118 B1 * | 1/2020 | Wu | ........................ | G06T 15/005 |
| 2002/0057850 A1 * | 5/2002 | Sirohey | ................. | G06T 3/4084 382/299 |
| 2006/0008144 A1 * | 1/2006 | Prasad | ............... | G06K 9/00818 382/173 |

* cited by examiner

*Primary Examiner* — Todd Buttram
(74) *Attorney, Agent, or Firm* — Volpe Koenig

(57) ABSTRACT

A technique for compressing an original image is disclosed. According to the technique, an original image is obtained and a delta-encoded image is generated based on the original image. Next, a segregated image is generated based on the delta-encoded image and then the segregated image is compressed to produce a compressed image. The segregated image is generated because the segregated image may be compressed more efficiently than the original image and the delta image.

20 Claims, 20 Drawing Sheets

600

| | | | | | | | |
|---|---|---|---|---|---|---|---|
| $P_{0,0}$ | $\Delta V_{0,2}$ | $\Delta V_{0,4}$ | $\Delta O_{0,5}$ | $\Delta V_{0,6}$ | $\Delta V_{0,7}$ | $\Delta V_{2,0}$ | $\Delta V_{2,2}$ |
| $\Delta V_{2,4}$ | $\Delta V_{2,5}$ | $\Delta V_{2,6}$ | $\Delta V_{2,7}$ | $\Delta V_{4,0}$ | $\Delta V_{4,2}$ | $\Delta V_{4,4}$ | $\Delta V_{4,6}$ |
| $\Delta V_{5,0}$ | $\Delta V_{5,2}$ | $\Delta V_{5,4}$ | $\Delta V_{5,6}$ | $\Delta V_{6,0}$ | $\Delta V_{6,2}$ | $\Delta V_{6,4}$ | $\Delta V_{6,6}$ |
| $\Delta V_{7,0}$ | $\Delta V_{7,2}$ | $\Delta V_{7,4}$ | $\Delta V_{7,6}$ | | | | |
| $\Delta O_{0,1}$ | $\Delta O_{0,3}$ | $\Delta O_{1,0}$ | $\Delta O_{1,1}$ | $\Delta O_{1,2}$ | $\Delta O_{1,3}$ | $\Delta O_{1,4}$ | $\Delta O_{1,5}$ |
| $\Delta O_{1,6}$ | $\Delta O_{1,7}$ | $\Delta O_{2,1}$ | $\Delta O_{2,3}$ | $\Delta O_{3,0}$ | $\Delta O_{3,1}$ | $\Delta O_{3,2}$ | $\Delta O_{3,3}$ |
| $\Delta O_{3,4}$ | $\Delta O_{3,5}$ | $\Delta V_{7,0}$ | $\Delta O_{3,7}$ | $\Delta V_{4,1}$ | $\Delta O_{4,3}$ | $\Delta V_{4,5}$ | $\Delta V_{4,7}$ |
| $\Delta V_{5,1}$ | $\Delta O_{5,3}$ | $\Delta O_{5,5}$ | $\Delta V_{5,7}$ | $\Delta O_{6,1}$ | $\Delta O_{6,3}$ | $\Delta O_{6,5}$ | $\Delta V_{6,7}$ |
| $\Delta O_{7,1}$ | $\Delta O_{7,3}$ | $\Delta O_{7,5}$ | $\Delta V_{7,7}$ | | | | |

IF CURRENT PIXEL IS SITUATED IN UPPER LEFT CORNER OF IMAGE
  DELTA VALUE = ACTUAL PIXEL VALUE OF CURRENT PIXEL
ELSE IF NEIGHBOR TO THE LEFT AVAILABLE
  DELTA VALUE = ACTUAL PIXEL VALUE OF NEIGHBOR TO THE LEFT – ACTUAL PIXEL VALUE OF CURRENT PIXEL
ELSE IF NEIGHBOR FROM ABOVE AVAILABLE
  DELTA VALUE = ACTUAL PIXEL VALUE OF NEIGHBOR FROM ABOVE – ACTUAL PIXEL VALUE OF CURRENT PIXEL
ELSE IF NEIGHBOR TO THE RIGHT AVAILABLE
  DELTA VALUE = ACTUAL PIXEL VALUE OF NEIGHBOR TO THE RIGHT – ACTUAL PIXEL VALUE OF CURRENT PIXEL
ELSE IF NEIGHBOR FROM BELOW AVAILABLE
  DELTA VALUE = ACTUAL PIXEL VALUE OF NEIGHBOR FROM BELOW – ACTUAL PIXEL VALUE OF CURRENT PIXEL

920

IF CURRENT PIXEL IS SITUATED IN UPPER LEFT CORNER OF IMAGE
  DELTA VALUE = ACTUAL PIXEL VALUE OF CURRENT PIXEL
ELSE IF NEIGHBOR FROM ABOVE AVAILABLE
  DELTA VALUE = ACTUAL PIXEL VALUE OF NEIGHBOR FROM ABOVE – ACTUAL PIXEL VALUE OF CURRENT PIXEL
ELSE IF NEIGHBOR TO THE RIGHT AVAILABLE
  DELTA VALUE = ACTUAL PIXEL VALUE OF NEIGHBOR TO THE RIGHT – ACTUAL PIXEL VALUE OF CURRENT PIXEL
ELSE IF NEIGHBOR FROM BELOW AVAILABLE
  DELTA VALUE = ACTUAL PIXEL VALUE OF NEIGHBOR FROM BELOW – ACTUAL PIXEL VALUE OF CURRENT PIXEL
ELSE IF NEIGHBOR TO THE LEFT AVAILABLE
  DELTA VALUE = ACTUAL PIXEL VALUE OF NEIGHBOR TO THE LEFT – ACTUAL PIXEL VALUE OF CURRENT PIXEL

FIG. 9

```
1210
FOR (X=0; X<TOTAL NUMBER OF ROWS; X++){
  FOR (Y=0; Y<TOTAL NUMBER OF COLUMNS; Y++){
    IF((X==0 OR X== EVEN NUMBER))
      STORE VALUE OF PIXEL AT ROW X, COLUMN Y IN PORTION 1032 OF SEGREGATED IMAGE;
    ELSE STORE VALUE OF PIXEL AT ROW X, COLUMN Y IN PORTION 1034 OF SEGREGATED IMAGE;
}}
```

```
1220
FOR (X=0; X<TOTAL NUMBER OF ROWS; X++){
  FOR (Y=0; Y<TOTAL NUMBER OF ROWS; Y++){
    IF((Y==0 OR Y== EVEN NUMBER))
      STORE VALUE OF PIXEL AT ROW X, COLUMN Y IN PORTION 1032 OF SEGREGATED IMAGE;
    ELSE STORE VALUE OF PIXEL AT ROW X, COLUMN Y IN PORTION 1034 OF SEGREGATED IMAGE;
}}
```

FIG. 12

PIXELATION OPTIMIZED DELTA COLOR COMPRESSION

CROSS REFERENCE TO RELATED APPLICATION

This application is a continuation of U.S. patent application Ser. No. 16/023,387, filed on Jun. 29, 2018, which is incorporated by reference as if fully set forth.

BACKGROUND

Three-dimensional ("3D") graphics processing pipelines perform a series of steps to convert input geometry into a two-dimensional ("2D") image for display on a screen. Some of the steps include rasterization and pixel shading. Rasterization involves identifying which pixels (or sub-pixel samples) are covered by triangles provided by stages of the pipeline prior to the rasterizer. The output of rasterization includes quads (a block of 2×2 pixels) and coverage data that indicates which samples are covered by the pixels of the quads. The pixel shader shades the pixels of the quads, and the pixels of the quads are then written to a frame buffer. Because pixel shading is very resource-intensive, techniques are constantly being developed to improve the efficiency of pixel shading.

BRIEF DESCRIPTION OF THE DRAWINGS

A more detailed understanding can be had from the following description, given by way of example in conjunction with the accompanying drawings wherein:

FIG. 6 is a diagram of a segregated image that is generated based on the delta-encoded image of FIG. 5, according to aspects of the disclosure;

FIG. 9 is a diagram illustrating further examples of delta functions, according to aspects of the disclosure;

FIG. 12 is a diagram illustrating examples of mapping functions, according to aspects of the disclosure;

DETAILED DESCRIPTION

The present disclosure provides a technique for compressing an original image. According to the technique, an original image is obtained. A delta-encoded image is then generated based on the original image. Next, a segregated image is generated based on the delta-encoded image. And finally, the segregated image is compressed to produce a compressed image. As is further discussed below, generating the segregated image is advantageous because the segregated image can be compressed more efficiently than the original image and the delta image.

The original image includes a plurality of pixels. Each pixel is represented by an actual pixel value, which is a number representing the color of the pixel. The delta-encoded image represents the same visual encoded content as the original image. The pixels in the delta-encoded image, however, are represented by respective delta values. The delta value for each pixel is calculated by subtracting the actual value for that pixel from the actual value of another pixel. The segregated image includes the same delta values as the delta-encoded image. Notably, in the segregated image, non-zero delta values are concentrated in a first portion of the segregated image, and the delta values that are equal to zero are concentrated in a second portion of the segregated image. Segregating the delta values in this manner permits the segregated image to be compressed more efficiently than any of the original image and the delta-encoded image when a variable compression algorithm is used to perform the compression.

According to aspects of the disclosure, a process is disclosed for compressing variable shading rate images without prior knowledge of the pixelation patterns used in the images. According to the process, an original image is obtained and a plurality of original sectors is identified in the original image. Next, for each of the original sectors, a plurality of delta functions and a plurality of mapping functions are tested to identify at least one of: (i) a respective delta function that is preferred for the sector, and (ii) a respective mapping function that is preferred for the sector. Each of the original sectors is then compressed using the original sector's respective preferred delta function and/or preferred mapping function to produce a respective compressed sector. And finally, all respective compressed sectors are consolidated to produce a compressed image corresponding to the original image.

Figure 1:
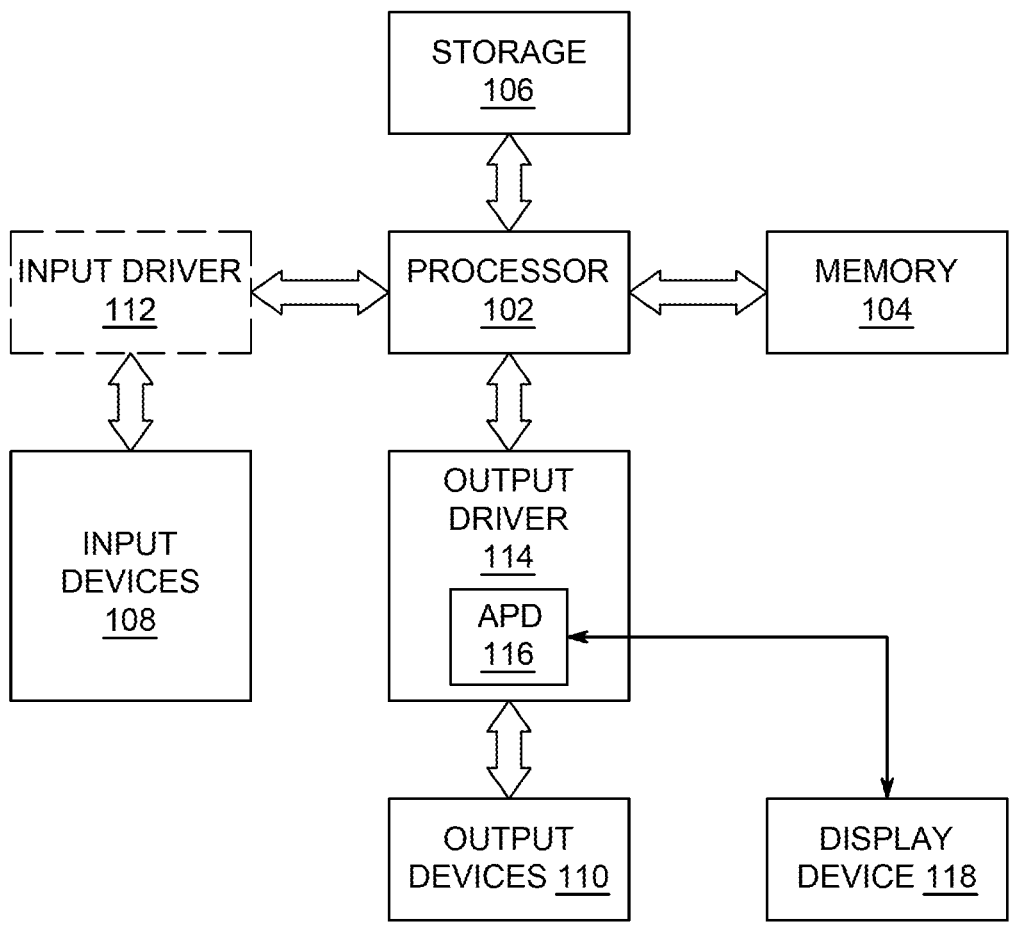
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
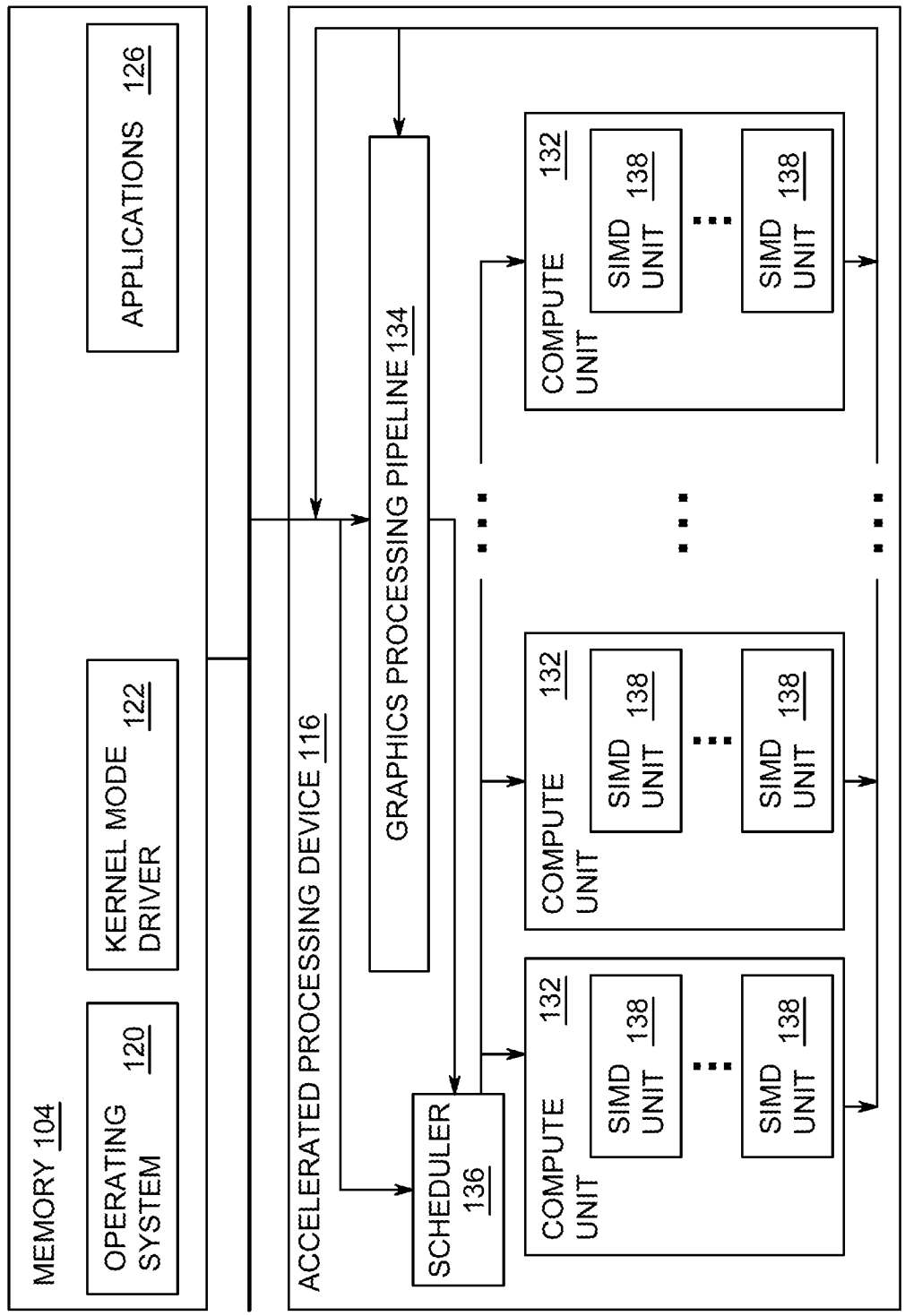
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
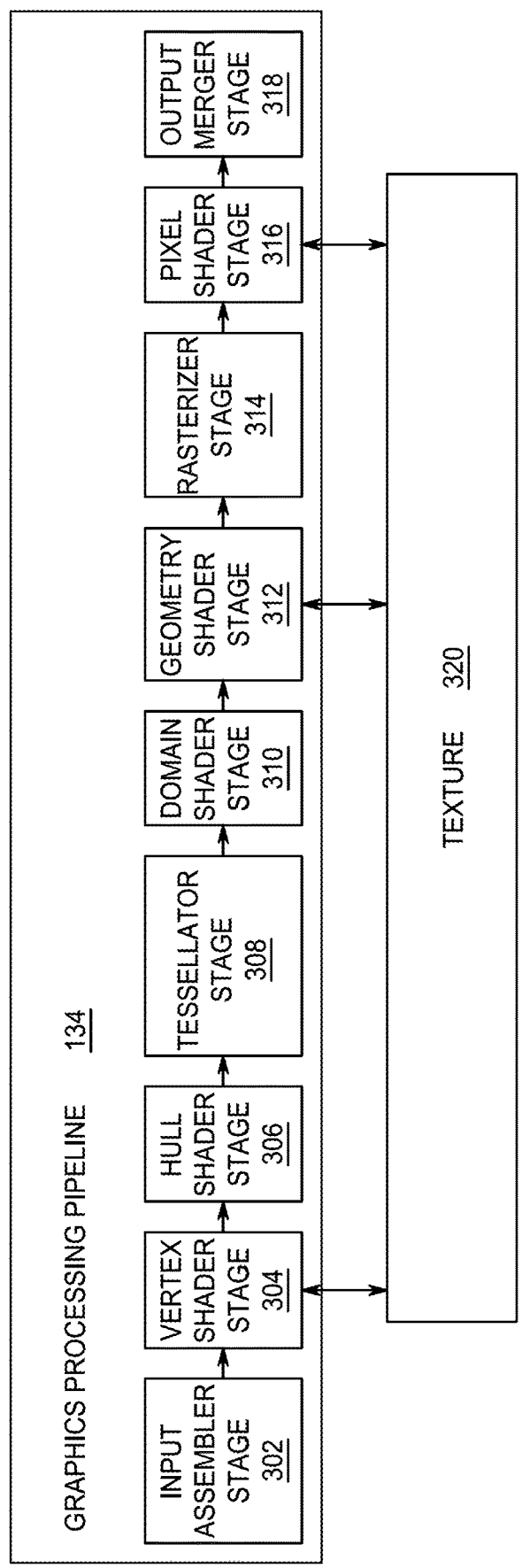
FIG. 3 is a block diagram illustrating a graphics processing pipeline, according to an example.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the programmable processing units 202.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. In some instances, a shader program that executes on the programmable processing units 202 perform operations for the geometry shader stage 312.

The rasterizer stage 314 accepts and rasterizes simple primitives and generated upstream. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel. In some implementations, the output merger stage 318 may be configured to receive images having a variable shading rate, such as variable rate shading (VRS) images or other types of pixelated images (e.g., pixelated images that have the same pixelation pattern throughout the entire image), and compress those images using a compression processes that is discussed further below with respect to FIGS. 4-19.

Texture data, which defines textures, are stored and/or accessed by the texture unit 320. Textures are bitmap images that are used at various points in the graphics processing pipeline 134. For example, in some instances, the pixel shader stage 316 applies textures to pixels to improve apparent rendering complexity (e.g., to provide a more "photorealistic" look) without increasing the number of vertices to be rendered. Additionally or alternatively, in some implementations, the texture unit 320 may be configured to receive images having a variable shading rate, such as VRS images or other types of pixelated images, and compress those images using a compression processes that is discussed further below with respect to FIGS. 4-19.

In some instances, the vertex shader stage 304 uses texture data from the texture unit 320 to modify primitives to increase complexity, by, for example, creating or modifying vertices for improved aesthetics. In one example, the vertex shader stage 304 uses a height map stored in the texture unit 320 to modify displacement of vertices. This type of technique can be used, for example, to generate more realistic looking water as compared with textures only being used in the pixel shader stage 316, by modifying the position and number of vertices used to render the water. In some instances, the geometry shader stage 312 accesses texture data from the texture unit 320.

FIGS. 4-7 provide an overview of a process for compressing images. The process includes the steps of obtaining a first image, delta-encoding the first image to produce a second image that includes a plurality of delta values, rearranging the order of delta values in the second image to produce a third image, and compressing the third image to produce a fourth image that is a compressed version of the first image. Although it can be used on all types of images, the process is especially well-suited for compressing pixelated images (e.g., images having a variable shading rate, VRS images, and the like) as it takes advantage of some of the redundancies that are inherent in those images.

Figure 4:
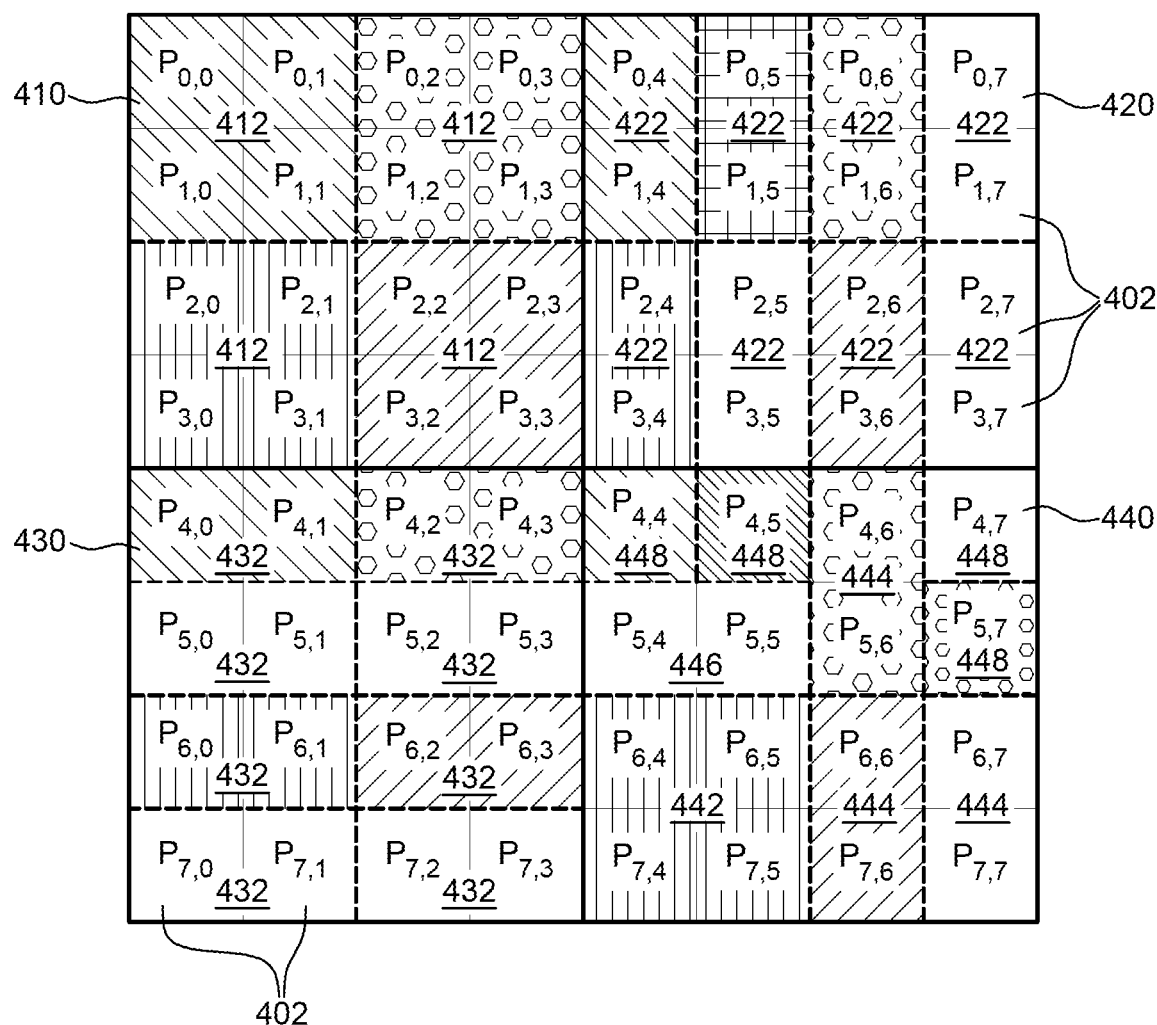
FIG. 4 is a diagram of an original image having a variable shading rate, according to aspects of the disclosure.

FIG. 4 is a diagram of an image 400 including a plurality of pixels 402. Each pixel 402 is represented by a value P which corresponds to the color of the pixel. In the example of FIG. 4, the subscript (r, c) which is provided next to each pixel value P denotes the row and column where the pixel is located in the image. As illustrated in FIG. 4, the pixel having identifier $P_{0,0}$ is situated in the upper left corner of the image 400 and the pixel having identifier $P_{7,7}$ is situated in the bottom right corner of the image 400. For the purposes of the present disclosure, the value P of any pixel 402 is referred to as the "actual value" of that pixel, and it includes a number identifying the color of the pixel. By way of example, the value P of any pixel 402 may include one or more of a raw pixel value, a pixel value that is encoded using an image compression algorithm (e.g., JPG, PNG, and the like), a pixel value that is encoded in the RGB color space, a pixel value that is encoded in the RGBY color, a pixel value that is encoded in the CrCyCb color space, a pixel value corresponding to a particular color channel (e.g., a blue channel or a red channel) and/or any other suitable representation of a pixel in an image. Although in the present example, the image 400 is a color image, alternative implementations are possible in which the image 400 is a monochromatic image.

The image 400 has a variable shading rate, and it includes image sectors 410, 420, 430, and 440. Sector 410 has a 2×2 pixelation pattern, and it includes four pixel groups 412. Each pixel group 412 includes four pixels that have the same color. Sector 420 has a 1×2 pixelation pattern, and it includes eight pixel groups 422. Each pixel group 422 includes two pixels that have the same color, which may be different from the color of neighboring groups. Sector 430 has a 2×1 pixelation pattern, and it includes eight pixel groups 432. Each pixel group 432 includes two pixels which have the same color. As illustrated, the pixel groups within in each of the image sectors 410, 420, and 430 have the same size, and for this reason, the image sectors 410, 420, and 430 are said to have a uniform pixelation pattern. Thus, in some implementations, an image sector is said to have a uniform pixelation pattern when the image sector includes a plurality of pixel groups, such that all pixel groups are the same size, and the pixels in each group are the same (or similar) color. In the present example, the image 400 is a VRS image, however alternative implementations are possible in which the image 400 is any suitable type of image that has a variable shading rate. By way of example, the phrases "variable shading rate" or "variable shading rate image" may refer to any image in which at least two different portions of the image have different pixilation patterns.

By contrast, sector 440 has a mixed pixelation pattern. Image sector 440 includes one pixel group 442, three pixel groups 444, one pixel group 446, and four pixel groups 448. Pixel group 442 includes four pixels that have the same color, and it is said to have a 2×2 pixelation pattern. Pixel groups 444 include two pixels each that have the same color, and they have a 1×2 pixelation pattern. Pixel group 446 includes two pixels that have the same color, and it has a 2×1 pixelation pattern. Pixel groups 448 each include 1 pixel only, and it has a 1×1 pixelation pattern. In some implementations, an image sector is said to have a mixed pixelation pattern when the image sector includes a plurality of pixel groups, such that: (i) at least two of the pixel groups have different sizes, and (ii) the pixels in each group are the same (or similar) color.

Figure 5:
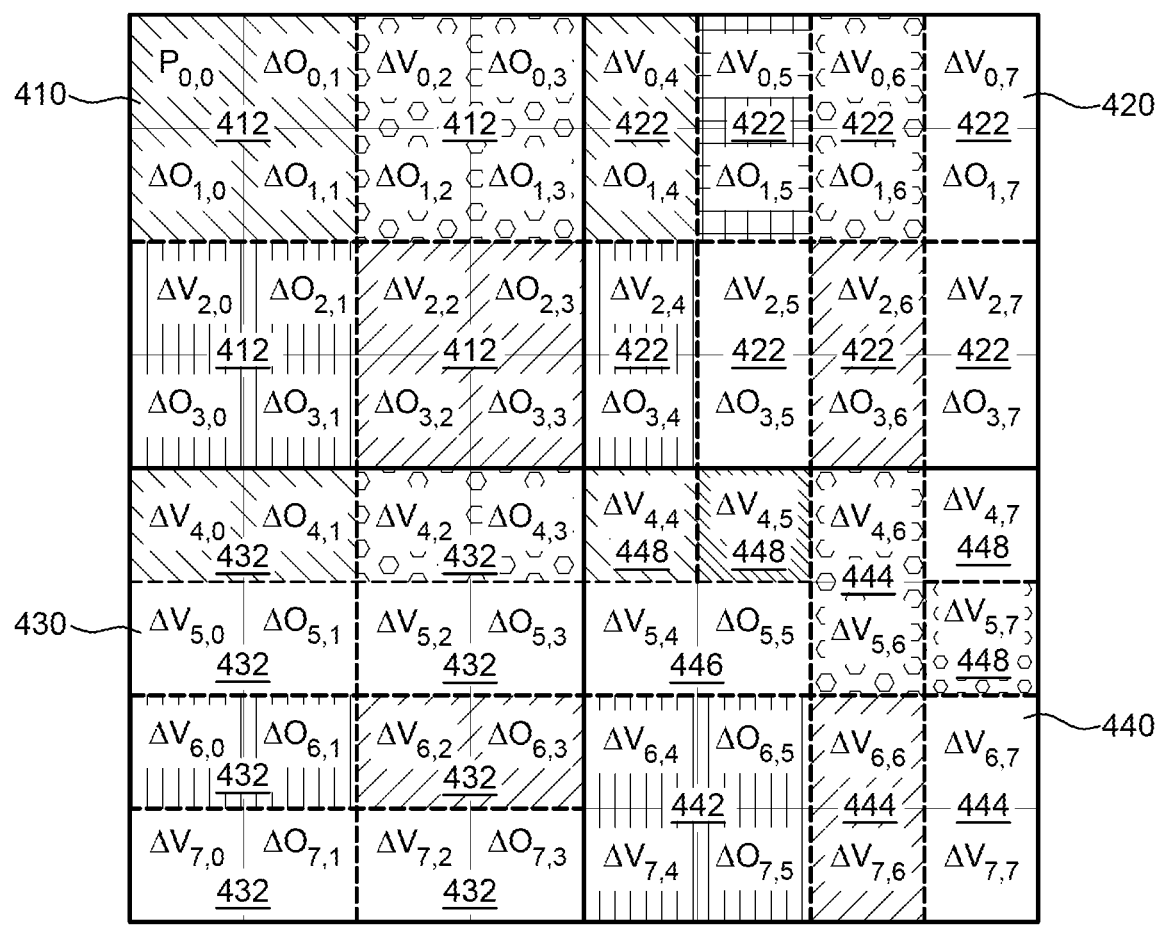
FIG. 5 is a diagram of a delta-encoded image that is generated based on the original image of FIG. 4, according to aspects of the disclosure.

FIG. 5 is a diagram of an image 500 that is generated by encoding the image 400. The image 500 also includes the pixels 402. In contrast to the image 400, in the image 500, each pixel 402 is represented by a delta value Δ that is generated based on the actual value P of that pixel in the image 400 and the actual value P of another pixel in the image 400. In some implementations, each delta value $\Delta_{r,c}$ is generated based on a delta function $DF(P_{r,c}, P_{a,b})$ where $0 \le r \le 7$, $0 \le c \le 7$, $0 \le a \le 7$, $a \ne r$, $0 \le b \le 7$, $b \ne r$. In the present example, the delta value Δ for each pixel 402 is generated by subtracting the pixel's actual value P from the actual value of another pixel that is situated in the same pixel group. As a result, all duplicative pixels in any of the pixel groups 412, 422, 432, 442, 444, and 446 have delta values equal to zero. In the present example, the notation $\Delta 0_{r,c}$ indicates that the pixel at row r and column c has a delta value that is equal to zero, whereas the notation $\Delta V_{r,c}$ indicates that the pixel at row r, column c has a delta value that is different from zero. Throughout the disclosure, delta values that are equal to zero are referred to as "zero delta values", and delta values that are different from zero are referred to as "non-zero delta values." As used throughout the disclosure, the term "delta function" refers to any suitable function for generating a delta value for a given pixel based at least in part on: (1) the difference between the actual value of the given pixel and the actual value of another pixel in the same image, and/or (2) the difference between the actual value of the other pixel and the actual value of the given pixel. In the present example, at least some of the image sectors 410-440 are encoded using different delta functions.

FIG. 6 is a diagram of an image 600 that is generated by encoding the image 500 based on a mapping function. The image 600 includes the same delta values as the image 500. However, in the image 600, the delta values are arranged in a different order, relative to one another than in the image 500. The image 600 is generated by applying a plurality of mapping functions on the image 500. In the present example, at least some of the image sectors 410-440 are encoded using different mapping functions.

When the image 500 is encoded with the mapping functions to produce the image 600, the delta values for the pixels 402 that are different from zero are concentrated in a portion 610 of the image 600, whereas the delta values for the pixels 402 that are equal to zero are concentrated in the portion 620 of the image 600. Accordingly, the portion 620 includes a greater concentration of zero delta values than the portion 610. According to the present example, the portions 610 and 620 of the image 600 are stored in respective contiguous memory spaces. As is further discussed below with respect to FIG. 7, fully or partially segregating the zero and non-zero delta values in the image 600 is advantageous because it allows the image 600 to be compressed at a higher compression rate than the image 500 when a variable compression rate algorithm is used to compress the images.

FIG. 6 further illustrates that the image 600 includes a plurality of segments 612. In the present example, segments 612*a-d* are part of the portion 610 of the image 600, and the segments 612*e-i* are part of the portion 620. By way of example, in some implementations, each segment 612 may include one either one pixel value or two or more pixel values that are stored in consecutive memory locations. According to aspects of the disclosure, two memory locations are considered consecutive if they have consecutive physical addresses and/or consecutive virtual addresses. The virtual address of a memory location may include any suitable type of identifier that can be used to retrieve data from that memory location, such as an array index for example.

Figure 7:
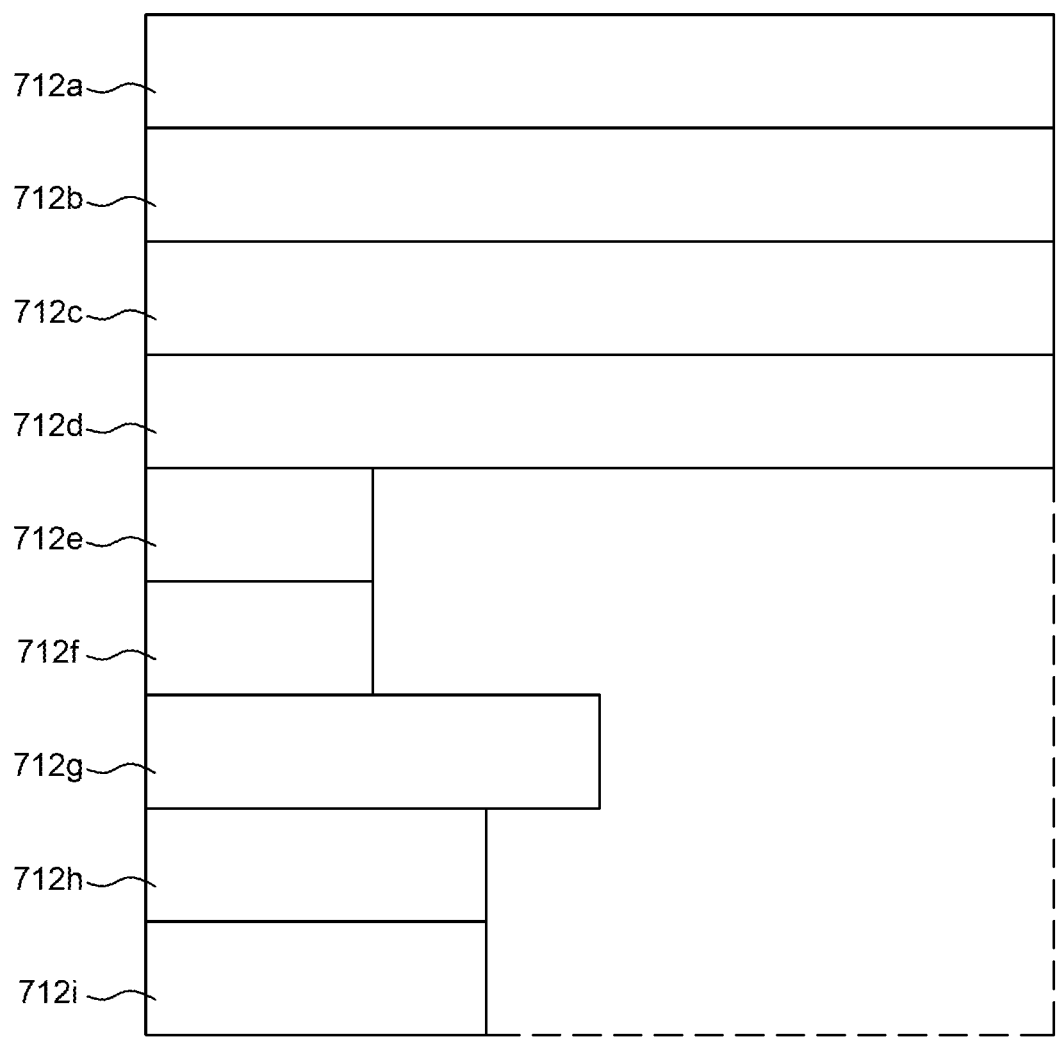
FIG. 7 is a diagram of a compressed image that is generated based on the segregated image of FIG. 6.

FIG. 7 is a diagram of an image 700 that is generated by compressing the image 600. In the image 700, each segment 612 of the image 600 is compressed independently of the rest to produce a corresponding compressed segment 712. In the present example, the bit rate of any given compressed segment 712 is be calculated by using equation 1 below:

$$BR = \max(NB) * NP \qquad \text{Equation (1)}$$

where BR is the bit rate of the given compressed segment 712, max(NB) is the number of bits used to represent the largest pixel value in the given segment 612 which is being compressed to generate the given compressed segment 712, and NP is the total number of pixels in the given segment 612. Under this arrangement, a segment that includes only zero delta values can be represented by a number of bits that is equal to (or not much larger than) the total number of pixels.

FIG. 7 illustrates that the segments 612 in the portion 620 of the image 600 can be compressed to a greater extent than the segments 612 in the portion 610 of the image 600 on account of the higher concentration or zero delta values in the portion 620 of the image 600. In accordance with the example of FIG. 7, the compressed segment 712a of the image 700 is generated by compressing the segment 612a of the image 600, and it has a first bit rate; the compressed segment 712b of the image 700 is generated by compressing the segment 612b of the image 600, and it has a second bit rate that is equal to the first bit rate; the compressed segment 712c of the image 700 is generated by compressing the segment 612c of the image 600, and it has a third bit rate that is equal to the second bit rate; the compressed segment 712d of the image 700 is generated by compressing the segment 612d of the image 600, and it has a fourth bit rate that is equal to the third bit rate; the compressed segment 712e of the image 700 is generated by compressing the segment 612e of the image 600, and it has a fifth bit rate that is less than the fourth bit rate; the compressed segment 712f of the image 700 is generated by compressing the segment 612f of the image 600, and it has a sixth bit rate that is equal to the fifth bit rate; the compressed segment 712g of the image 700 is generated by compressing the segment 612g of the image 600, and it has a seventh bit rate that is greater than the sixth bit rate and less than the fourth bit rate; the compressed segment 712h of the image 700 is generated by compressing the segment 612h of the image 600, and it has an eight bit rate that is less than the seventh bit rate and greater than the sixth bit rate; and the compressed segment 712i of the image 700 is generated by compressing the segment 612i of the image 600, and it has a ninth bit rate that is equal to the eight bit rate. In some implementations, each compressed segment 712 includes either one pixel value or two or more pixel values that are stored in consecutive memory locations.

Figure 17:
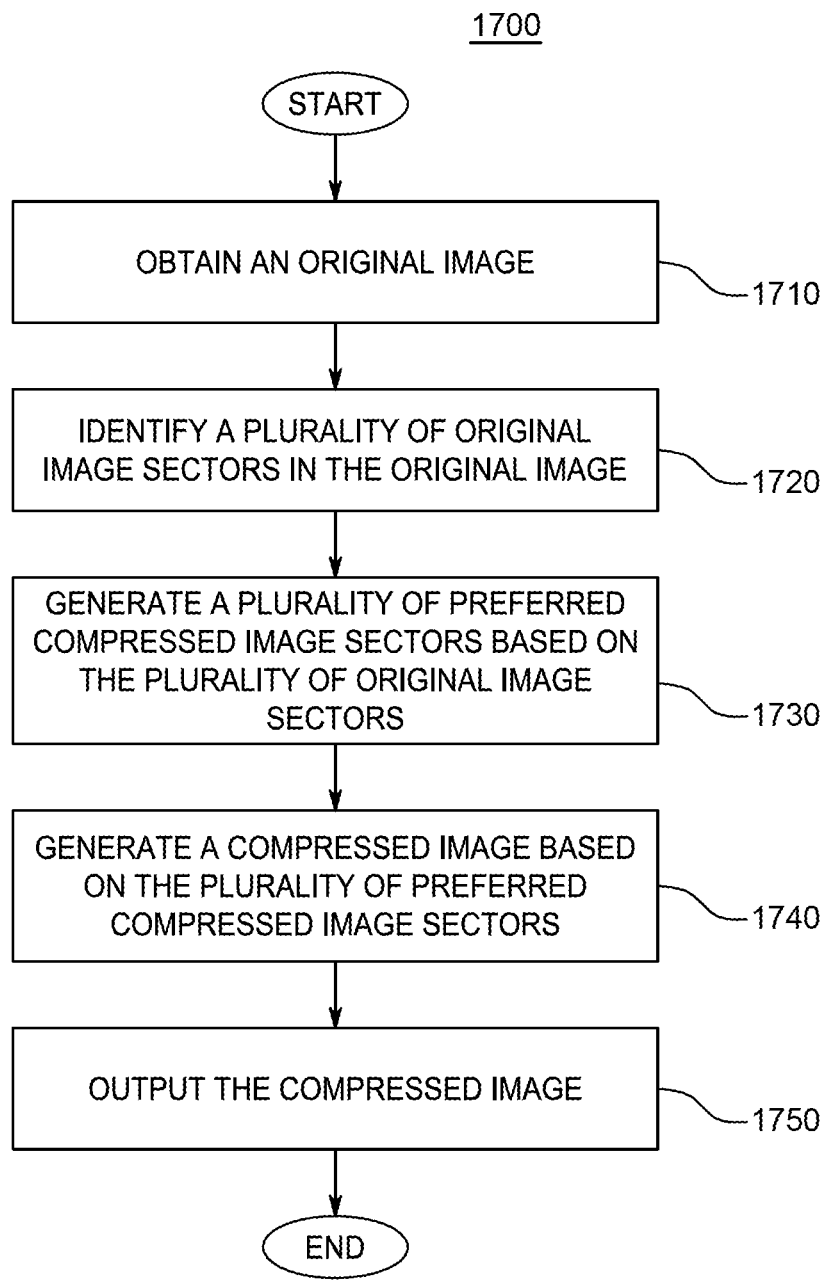
FIG. 17 is a flowchart of an example of a process for compressing images, according to aspects of the disclosure.

Although in the present example a single delta-encoded image is created based on all sectors in the image 400, alternative implementations are possible in which a different delta-encoded sector is created for each of the sectors in the image 400. In such instances, the delta-encoded sectors may be rearranged (or swizzled) into the same segregated image (e.g., as shown in FIG. 7) or into multiple segregated image sectors (e.g., as shown in FIG. 17). Although in the present example, the image sectors 410-440 of the image 500 are rearranged (or swizzled) into the same segregated image, alternative implementations are possible in which each of the sectors is rearranged (or swizzled) in a different segregated sector. In such instances, each of the segregated sectors may be compressed as discussed with respect to FIG. 7, after which the compressed sectors can be consolidated to form a single compressed image.

In summary, FIGS. 4-7 provide an overview of a process for compressing images in which: the image 400 is delta-encoded to produce an image 500; the image 500 is rearranged (or swizzled) to produce the image 600; and the image 600 is compressed using a variable compression rate process to produce the image 700. The delta-encoding of the image 400 is performed using one or more delta functions, and the rearranging (or swizzling) of the image 500 is performed using one or more mapping functions. According to aspects of the disclosure, the efficiency of the process for compressing images depends on: (1) the ability of the one or more delta functions that are used to maximize the total count of zero delta values, and (2) the ability of the one or more mapping functions to maximize the count of zero delta values that are situated in the portion 620 of the image 600.

FIGS. 8-11 provide an example of different delta functions that can be used to encode an image and/or an image sector. FIGS. 8-11 further illustrate that the count of zero values that are produced by a particular delta function can be correlated to the pixelation pattern of the image and/or image sector. Furthermore, FIGS. 8-11 indicate that which delta function is preferred for a particular image and/or image sector depends on the pixelation pattern of the image sector.

Figure 8:
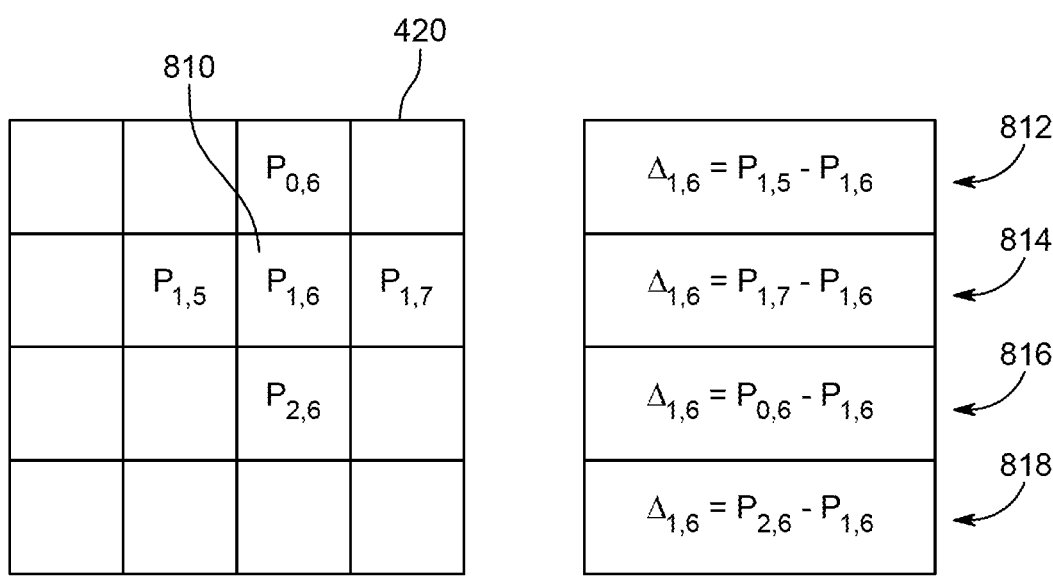
FIG. 8 is a diagram illustrating examples of delta functions, according to aspects of the disclosure.

FIG. 8 depicts an example of different delta functions that can be used to delta-encode a pixel 810 in the image sector 420. As illustrated, delta function 812 calculates the delta value $\Delta 0_{1,6}$ of the pixel 810 based on a difference between the actual value $P_{1,5}$ of the pixel's 810 neighbor to the left and the actual value $P_{1,6}$ of the pixel 810. Delta function 814 calculates the delta value $\Delta 0_{1,6}$ of the pixel 810 based on a difference between the actual value $P_{1,7}$ of the pixel's 810 neighbor to the right and the actual value $P_{1,6}$ of the pixel 810. Delta function 816 calculates the delta value $\Delta 0_{1,6}$ of the pixel 810 based on a difference between the actual value $P_{1,6}$ of the pixel's 810 neighbor from above and the actual value $P_{1,6}$ of the pixel 810. And delta function 818 calculates the delta value $\Delta 0_{1,6}$ of the pixel 810 based on a difference between the actual value $P_{2,6}$ of the pixel's 810 neighbor from below and the actual value $P_{1,6}$ of the pixel 810.

FIG. 9 shows further examples of delta functions for calculating the delta value of a given pixel in the image sector 420, which take into account cases in which the given pixel is situated on the edge of the image sector 420. Delta function 910 provides that the delta value for the pixel is calculated based on the pixel's neighbor to the left, when the pixel has a neighbor to the left. By contrast, delta function 920 provides that the delta value for the given pixel is calculated based on the value of the pixel's neighbor from above when such neighbor is available.

Figure 10:
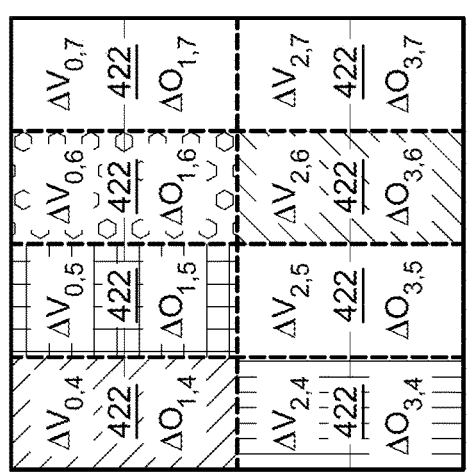
FIG. 10 is a diagram illustrating examples of delta-encoded image sectors that are generated by using one of the delta functions of FIG. 9, according to aspects of the disclosure.

FIG. 10 shows an example of delta-encoded image sectors 1010 and 1020. The delta-encoded image sector 1010 is generated by encoding the image sector 420 of the image 400 with the delta function 910. The delta-encoded image sector 1020 is generated by encoding the image sector 420 of the image 400 with the delta function 920. FIG. 10 illustrates, that encoding the image sector 420 with the delta function 920 causes more zero delta values to be present in the resultant delta-encoded image sector than when the image sector 420 is encoded with the delta function 910. More specifically, in accordance with the example of FIG. 10, encoding the image sector 420 with the delta function 920 results in all duplicative pixels in the image sector being assigned zero delta values, whereas encoding the image sector 420 with the delta function 910 results in the duplicative pixels being assigned non-zero delta values.

Figure 11:
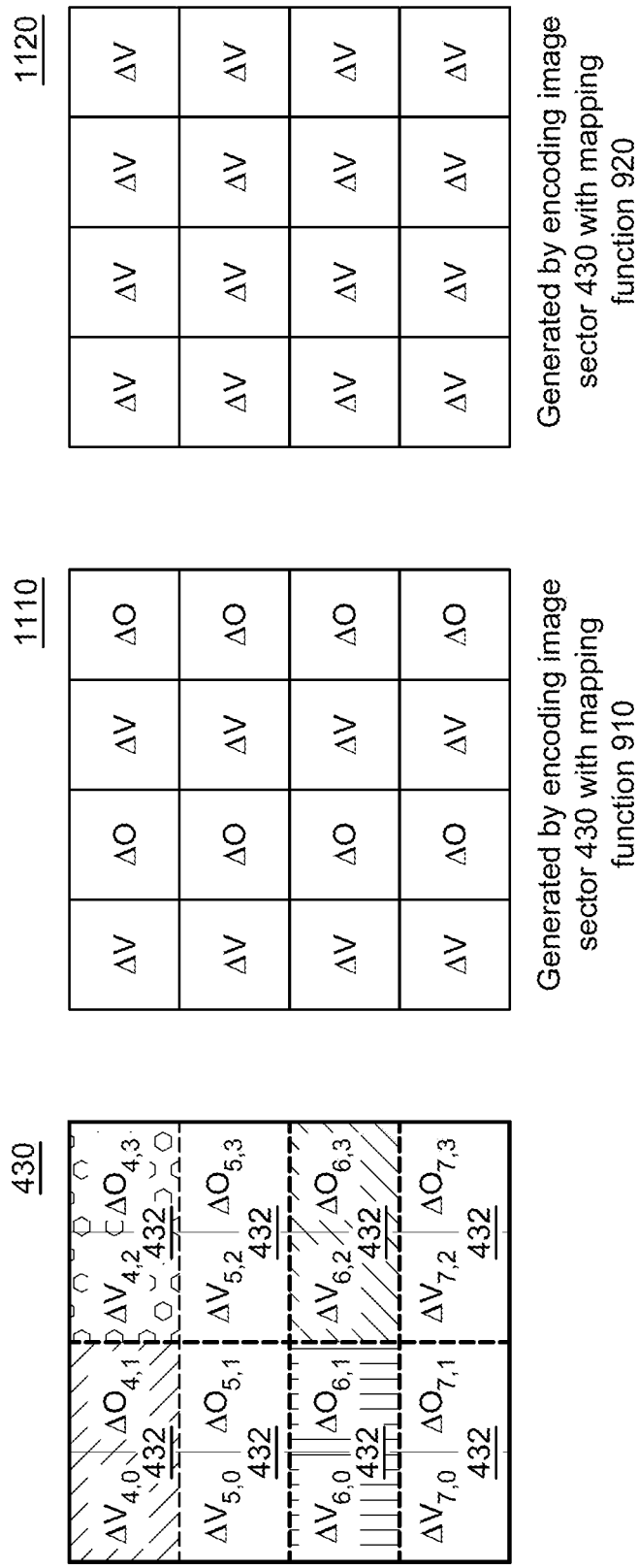
FIG. 11 is a diagram illustrating examples of delta-encoded image sectors that are generated by using another one of the delta functions of FIG. 9, according to aspects of the disclosure.

FIG. 11 shows an example of delta-encoded image sectors 1110 and 1120. The delta-encoded image sector 1120 is generated by encoding the image sector 430 of the image 400 with the delta function 910. The delta-encoded image sector 1120 is generated by encoding the image sector 430 of the image 400 with the delta function 920. FIG. 11 illustrates that encoding the image sector 420 with the delta function 910 causes more zero delta values to be present in the resultant delta-encoded image sector than when the image sector 430 is encoded with the delta function 920. More specifically, in accordance with the example of FIG. 11, encoding the image sector 430 with the delta function 910 results in all duplicative pixels in the image sector being assigned zero delta values, whereas encoding the image sector 430 with the delta function 920 results in the duplicative pixels being assigned non-zero delta values.

FIGS. 8-11 illustrate that the preferred function for delta-encoding a particular image sector (or image) depends on the image sector's pixelation pattern. More particularly, FIG. 10 illustrates that the delta function 920 is preferred for the 2×1 pixelation pattern. By contrast, FIG. 11 illustrates that the delta function 910 is preferred for the 1×2 pixelation pattern. According to the present example, a delta function is considered preferred for the pixelation pattern of a given image (or image sector) when the delta function causes all duplicative pixel values in the image (or image sector) to have zero delta values when the image (or image sector) is encoded with the delta function. Additionally or alternatively, in some implementations, a delta function is considered preferred for a particular pixelation pattern when that function yields the greatest number of zero delta values, from among a plurality of available delta functions. In some implementations, a delta function is considered available when a representation of the delta function is stored in a memory of a device performing the process discussed with respect to FIGS. 8-11. Additionally or alternatively, in some implementations, a delta function is considered available when an identifier for retrieving a representation of the delta function is stored in a memory of a device performing the process discussed with respect to FIGS. 8-11.

Figure 13:
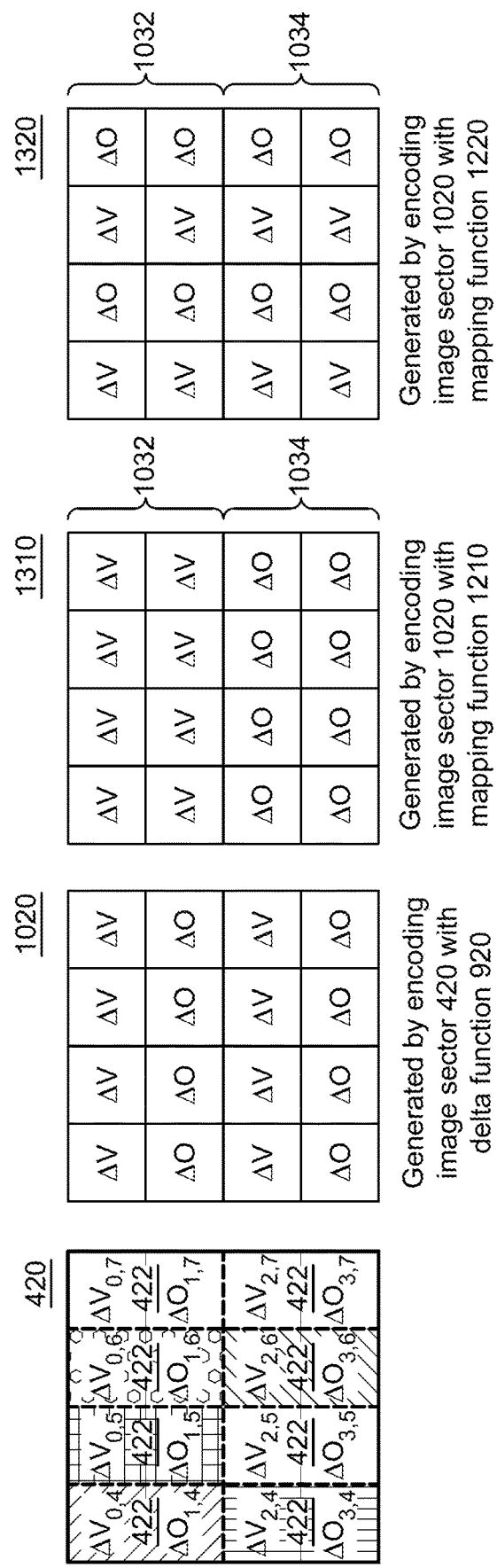
FIG. 13 is a diagram illustrating examples of segregated image sectors that are generated by using the mapping functions of FIG. 12, according to aspects of the disclosure.
Figure 14:
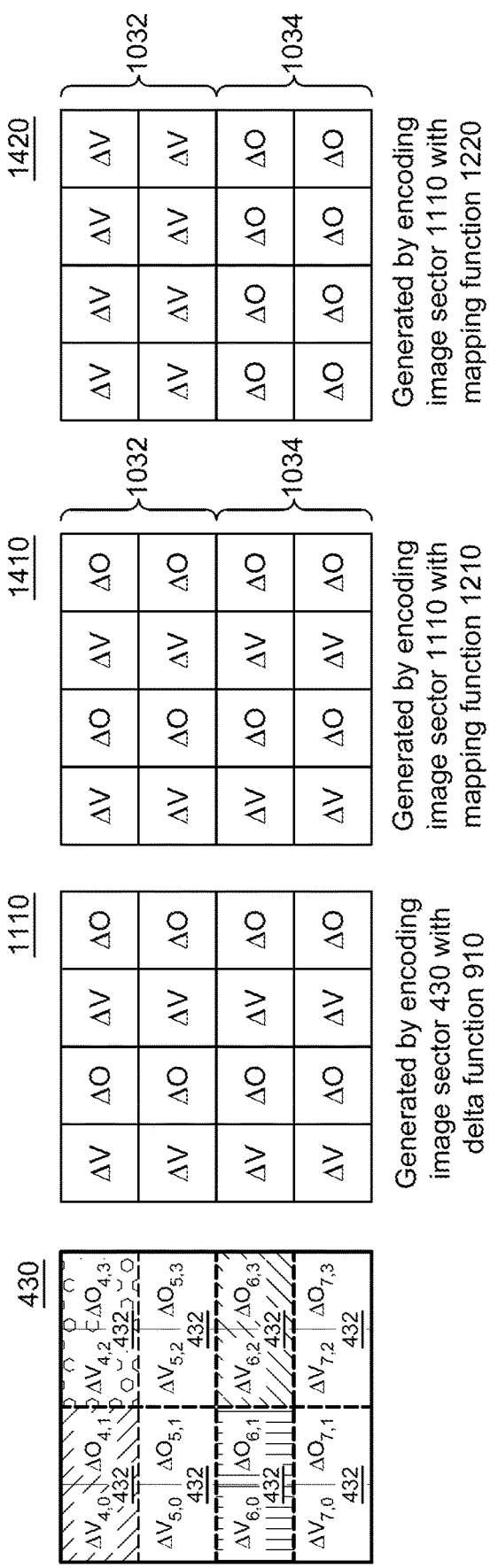
FIG. 14 is a diagram illustrating examples of segregated image sectors that are generated by using different mapping functions, according to aspects of the disclosure.

FIGS. 12-14 provide an example of different mapping functions that can be used to rearrange (or swizzle) an image and/or an image sector. FIGS. 12-14 further illustrate that the extent to which zero delta values and non-zero delta values are segregated in an image sector by a particular mapping function depends on the pixelation pattern of the image sector. In this regard, FIGS. 12-14 illustrate that which delta function is preferred for a particular image and/or image sector depends on the pixelation pattern of the image sector.

FIG. 12 depicts examples of mapping functions for encoding an image sector or an image to produce a segregated image sector or a segregated image. Generally, mapping function 1210 provides that the pixel values in even-numbered rows are placed in a portion 1032 of the segregated image, while all remaining pixel values are stored in a portion 1034 of the segregated image. Mapping function 1220, on the other hand, provides that the pixel values in even-numbered columns are placed in a portion 1032 of the segregated image, while all remaining pixel values are stored in a portion 1034 of the segregated image.

FIGS. 13 and 14 show examples of different segregated image sectors that are generated using the mapping functions 1210 and 1220. Each segregated image sector includes a portion 1032 and a portion 1034. In some implementations, each portion 1032 is stored in a contiguous memory segment. Additionally or alternatively, in some implementations, each portion 1034 is stored in a contiguous memory segment.

FIG. 13 depicts an example of segregated image sector 1310 that is generated by rearranging the order (i.e., swizzling) of pixel values that are part of the delta-encoded image sector 1020 with the mapping function 1210. As illustrated, when the mapping function 1210 is used to rearrange (or swizzle) the delta-encoded image sector 1020, all non-zero delta values are placed in the portion 1032 of the segregated image sector 1310 and all zero delta values are placed in the portion 1034 of the segregated image sector 1310. As can be readily appreciated, using the mapping function 1210 to rearrange (or swizzle) the delta-encoded image sector 1020 effectively results in placing all zero delta values in one contiguous memory segment, while all non-zero delta values are placed in another contiguous memory segment.

FIG. 13 further depicts an example of a segregated image sector 1320 that is generated by rearranging (or swizzling) the delta-encoded image sector 1020 with the mapping function 1220. As illustrated, when the mapping function 1220 is used to rearrange (or swizzle) the delta-encoded image sector 1020, some non-zero delta values are placed in the portion 1032 of the image sector 1020, while the rest are placed in the portion 1034. Accordingly, using the mapping function 1210 to encode the delta-encoded image sector 1020 results in a lesser degree of segregation between the zero and non-zero delta values than when the mapping function 1220 is used.

FIG. 14 depicts an example of a segregated image sector 1410 that is generated by rearranging (or swizzling) the delta-encoded image sector 1110 with the mapping functions 1210. As illustrated, when the mapping function 1210 is used to rearrange (or swizzle) the delta-encoded image sector 1020, some non-zero delta values are placed in the portion 1032 of the segregated image sector 1410, while the rest are placed in the portion 1034 of the segregated image sector 1410.

FIG. 14 further depicts an example of a segregated image sector 1420 that is generated by rearranging (or swizzling) the delta-encoded image sector 1110 with the mapping function 1220. As illustrated, when the mapping function 1220 is used to rearrange (or swizzle) the delta-encoded image sector 1110, all non-zero delta values are placed in the portion 1032 of the segregated image sector 1420, while all zero delta values are placed in the portion 1034 of the segregated image sector 1420. Accordingly, using the mapping function 1220 to encode the delta-encoded image sector 1120 results in a greater degree of segregation between the zero and non-zero delta values than when the mapping function 1210 is used.

FIGS. 12-14 illustrate that the preferred function for delta-encoding a particular image sector (or image) depends on the image sector's pixelation pattern. More particularly, FIG. 13 illustrates that the mapping function 1210 is preferred for the 2×1 pixelation pattern and FIG. 14 illustrates that the mapping function 1220 is preferred for the 1×2 pixelation pattern. According to the present example, a mapping function is considered preferable for the pixelation pattern of an image (or image sector) when rearranging (or swizzling) a delta-encoded version of the image and/or image sector with the mapping function results in all non-zero delta values in the delta-encoded image being placed in a first portion of a resultant segregated image while all zero delta values are placed in a second portion of the segregated image. Additionally or alternatively, a mapping function is considered preferred for a particular pixelation pattern when that function yields the greatest degree of segregation between zero and non-zero delta values in a resultant segregated image, from among a plurality of available mapping functions. In some implementations, a mapping function is considered available when a representation of the mapping function is stored in a memory of a device performing the process discussed with respect to FIGS. 8-11. Additionally or alternatively, in some implementations, a mapping function is considered available when an identifier for retrieving a representation of the mapping function is stored in a memory of a device performing the process discussed with respect to FIGS. 8-11.

Figure 15:
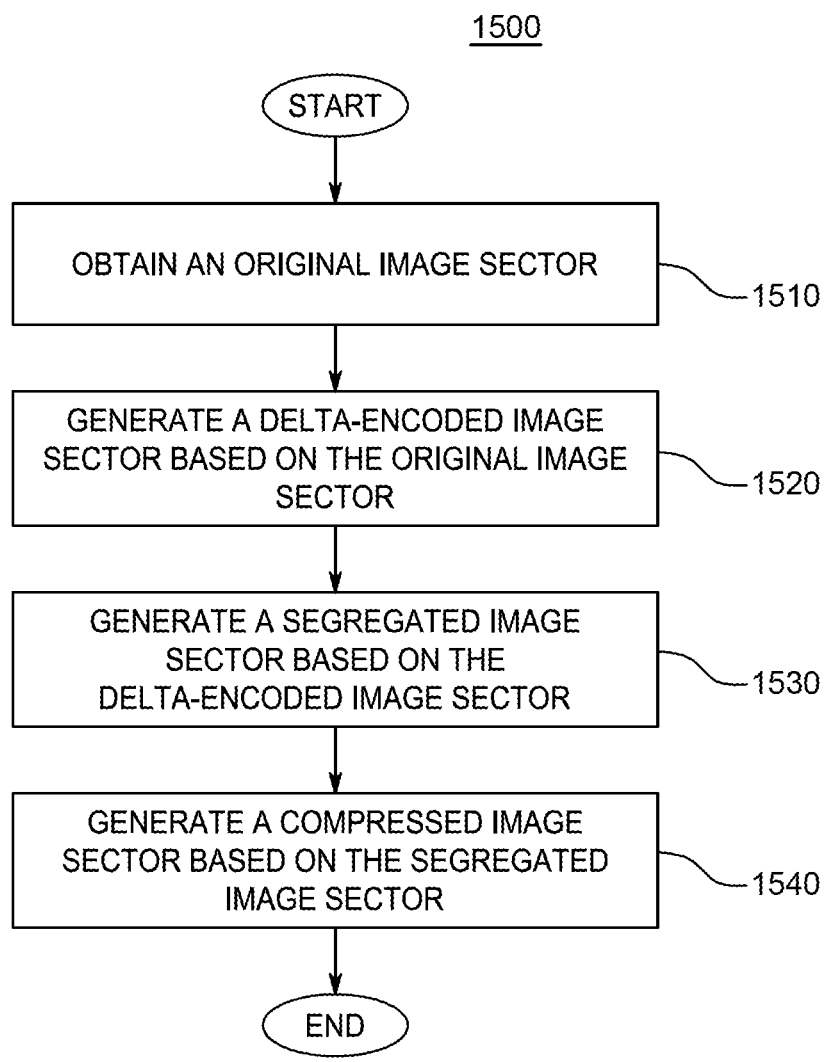
FIG. 15 is a diagram of an example of a process for generating a compressed image sector, according to aspects of the disclosure.

FIG. 15 is a flowchart of an example process 1500 for compressing an image sector based on a function pair including a respective delta function and a respective mapping function. In some implementations, the respective delta function is the same or similar to the delta function 920, which is discussed with respect to FIGS. 8-11. Additionally or alternatively, in some implementations, the respective mapping function is the same or similar to the mapping function 1210, which is discussed with respect to FIGS. 12-14.

According to the process, at step 1510, an image sector is obtained. In some implementations, the image sector is the same or similar to the image sector 420. At step 1520, a delta-encoded image sector is generated by encoding the image sector with the respective delta function. In some implementations, the delta-encoded image sector is the same or similar to the delta-encoded image sector 1020. At step 1530, a segregated image sector is generated by rearranging the order (e.g., swizzling) of the delta values in the delta-encoded image sector. In some implementations, the segregated image sector is the same or similar to the segregated image sector 1310. At step 1540, the segregated image sector is compressed to produce the compressed image sector. In some implementations, the compressed image sector is generated by compressing the segregated image sector in the manner discussed with respect to FIG. 7.

Figure 16A:
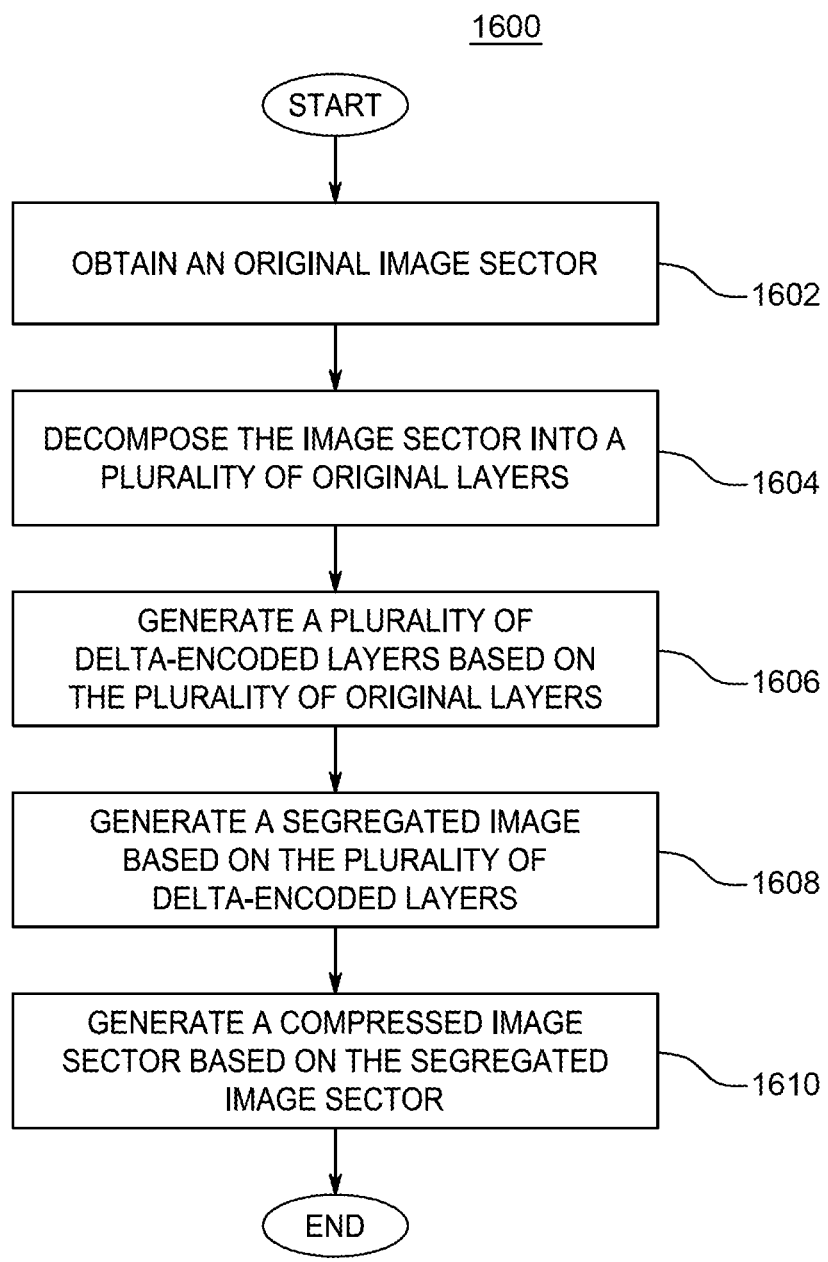
FIG. 16A is a flowchart of an example of a process for generating a compressed image sector, according to aspects of the disclosure.
Figure 16B:
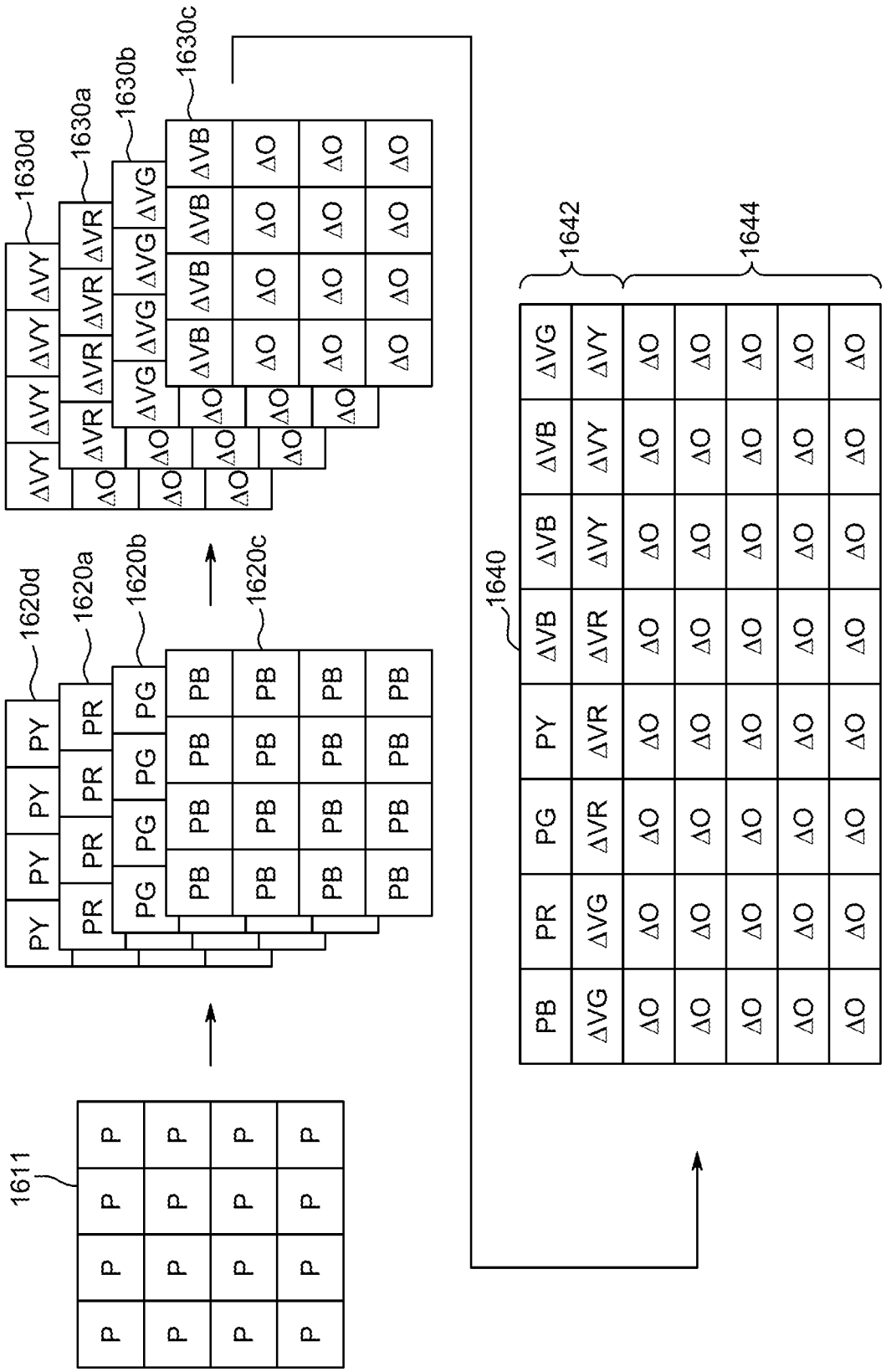
FIG. 16B is a diagram illustrating the operation of the process of FIG. 16A, according to aspects of the disclosure.

FIGS. 16A-B illustrate an example process 1600 for compressing a color image sector based on a function pair including a respective delta function and a respective mapping function. In some implementations, the respective delta function is the same or similar to the delta function 920, which is discussed with respect to FIGS. 8-11. Additionally or alternatively, the respective mapping function is the same or similar to the mapping function 1210, which is discussed with respect to FIGS. 12-14.

At step 1602, an image sector 1611 is obtained. At step 1604, the image sector 1611 is decomposed into layers 1620a, 1620b, 1620c, and 1620d. Each of the layers 1620a-d represents a different channel in the image sector 1611. Specifically, the layer 1620a includes a plurality of numerical values R, wherein each value R represents the red channel for a particular pixel. The layer 1620b includes a plurality of numerical values G, wherein each value G represents the green channel for a particular pixel. The layer 1620c includes a plurality of numerical values B, wherein each value B represents the blue channel for a particular pixel. And the layer 1620d includes a plurality of numerical values Y, wherein each value Y represents the yellow channel for a particular pixel.

At step 1606, the layers 1620a-d are separately encoded by using the delta function to produce a respective delta-encoded layer 1630. Specifically, the layer 1620a is encoded by using the delta function to produce the delta-encoded layer 1630a. The layer 1620b is encoded by using the delta function to produce the delta-encoded layer 1630b. The layer 1620c is encoded by using the delta function to produce the delta-encoded layer 1630c. And the layer 1620d is encoded by using the delta function to produce the delta-encoded layer 1630d. Stated succinctly, at step 1606, all of the layers 1630a-1630d are encoded independently of one another by using the same delta function.

At step 1608, the layers 1630a-d are jointly encoded by using the mapping function to produce a segregated image sector 1640. As illustrated, each of the non-zero delta values in the layers 1630a-d is stored in a first portion 1642 of the data structure, whereas each of the zero delta-values is stored in the second portion 1644 of the data structure.

At step 1610, the segregated image sector is compressed to produce a compressed image sector. In some implementations, the compression is performed in the manner discussed with respect to FIG. 7. The present disclosure is not limited to any specific algorithm for compressing the segregated data structure.

FIG. 17 is a flowchart of an example a process for encoding images, according to aspects of the disclosure. At step 1710, an original image is obtained. In some implementations, the original image has a variable shading rate. Additionally or alternatively, in some implementations, the original image is the same or similar to the image 400. Obtaining the original image may include one or more of retrieving the image from a memory, receiving the image over a communications network, receiving the image at one graphics pipeline stage from another stage of the graphics pipeline, and the like.

At step 1720, a plurality original image sectors in the original image is identified. In some implementations, at least some of the image sectors have different uniform pixelation patterns.

At step 1730, a plurality of preferred compressed image sectors is generated. In some implementations, each of the preferred compressed image sectors is generated independently from the rest of the preferred compressed image sectors. Additionally or alternatively, in some implementations, each of the preferred compressed image sectors is generated by compressing a different one of the image sectors identified at step 1720. As is further discussed below with respect to FIGS. 18 and 19 each of the preferred compression sectors is generated using at least one of a delta function that is preferred for the sector's pixelation pattern and/or a mapping function that is preferred for the sector's pixelation pattern.

At step 1740, the compressed sectors are consolidated to produce a compressed image. By way of example, consolidating the compressed image sectors may include one or more of encapsulating the compressed image sectors in the same data structure, appending the compressed image sectors after one another, and/or relating the compressed image sectors to one another in a way that permits the original image to be reconstituted (with or without information loss) from the compressed image sectors, creating a file that includes the compressed image sectors, generating metadata that can be used to reconstitute the original image from the compressed image sectors, and the like.

At step 1750, the compressed image is output. Outputting the compressed image may include one or more of displaying the compressed image on a display device, transmitting the compressed image, over a communications network, to another device, providing the compressed image to a next stage in a graphics pipeline, and the like.

Figure 18:
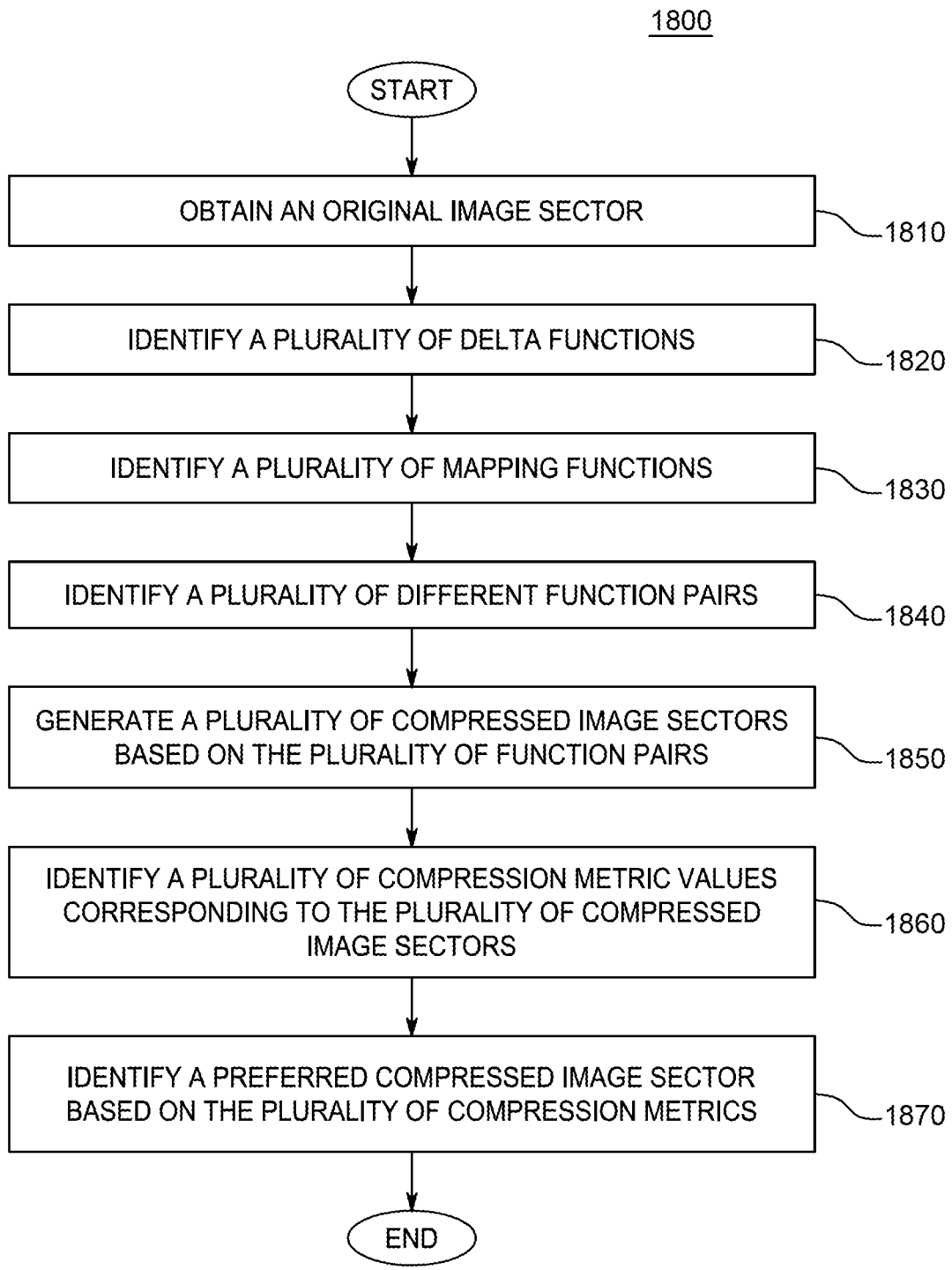
FIG. 18 is a flowchart of an example of a subprocess, associated with the process of FIG. 17, according to aspects of the disclosure.

FIG. 18 is a flowchart of an example process 1800 for compressing an image sector to produce a preferred compressed image sector, as discussed with respect to step 1730 of the process 1700.

At step 1810, an original image sector is obtained.

At step 1820, a plurality of available delta functions is identified. In some implementations, identifying the plurality of delta functions includes retrieving from a memory a respective identifier corresponding to the plurality of delta functions. Additionally or alternatively, in some implementations, identifying the plurality of delta functions includes retrieving from a memory a respective identifier for each of the plurality of delta functions.

At step 1830, a plurality of available mapping functions is identified. In some implementations, identifying the plurality of delta functions includes retrieving from a memory a respective identifier corresponding to the plurality of mapping functions. Additionally or alternatively, in some implementations, identifying the plurality of delta functions includes retrieving from a memory a respective identifier for each of the plurality of mapping functions.

At step 1840, a plurality of different function pairs is generated. Each function pair includes one of the plurality of delta functions and one of the plurality of mapping functions. According to the present disclosure, two function pairs are considered different if they include at least one of: (1) different delta functions and/or (2) different mapping functions.

At step 1850, a plurality of compressed images sectors is generated based on the original image sector. Each of the compressed image sectors is a compressed version of the original image sector. Each of the compressed image sectors is generated based on a different function pair. In some implementations, each of the compressed image sectors is generated in accordance with the process 1500 discussed above with respect to FIG. 15. Alternatively, in some implementations, each of the compressed image sectors may be generated in accordance with the process 1600, which is discussed above with respect to FIGS. 16A-B.

At step 1860, a plurality of compression metrics is generated. Each compression metric in the plurality indicates the extent to which a different one of the plurality of compressed image sectors is compressed, relative to the original image sector. In some implementations, the compression metric for a given compressed image sector includes at least one of a compression ratio for the given compressed image sector, size of the given compressed image sector (e.g., number of bits needed to encode the image sector), and/or a difference in size between the original image sector and the given compressed image sector.

At step 1870, one of the plurality of compressed image sectors is selected as the preferred compressed image sector. The selection is made based on at least some (or all) of the plurality of compression metrics. In some implementations, the preferred compressed image sector is the compressed image sector in the plurality of compressed image sectors that is compressed to the greatest extent, relative to the original image sector. Additionally or alternatively, in some implementations, the preferred compressed image sector is the image sector having the lowest (or highest) compression metric. In some implementations, selecting the preferred compressed image sector includes comparing the plurality of compression metrics to one another and identifying the image sector having the lowest or highest compression metric. Additionally or alternatively, in some implementations, the preferred compressed image sector may be one which has the highest compression ratio in the plurality of compressed image sectors.

Figure 19:
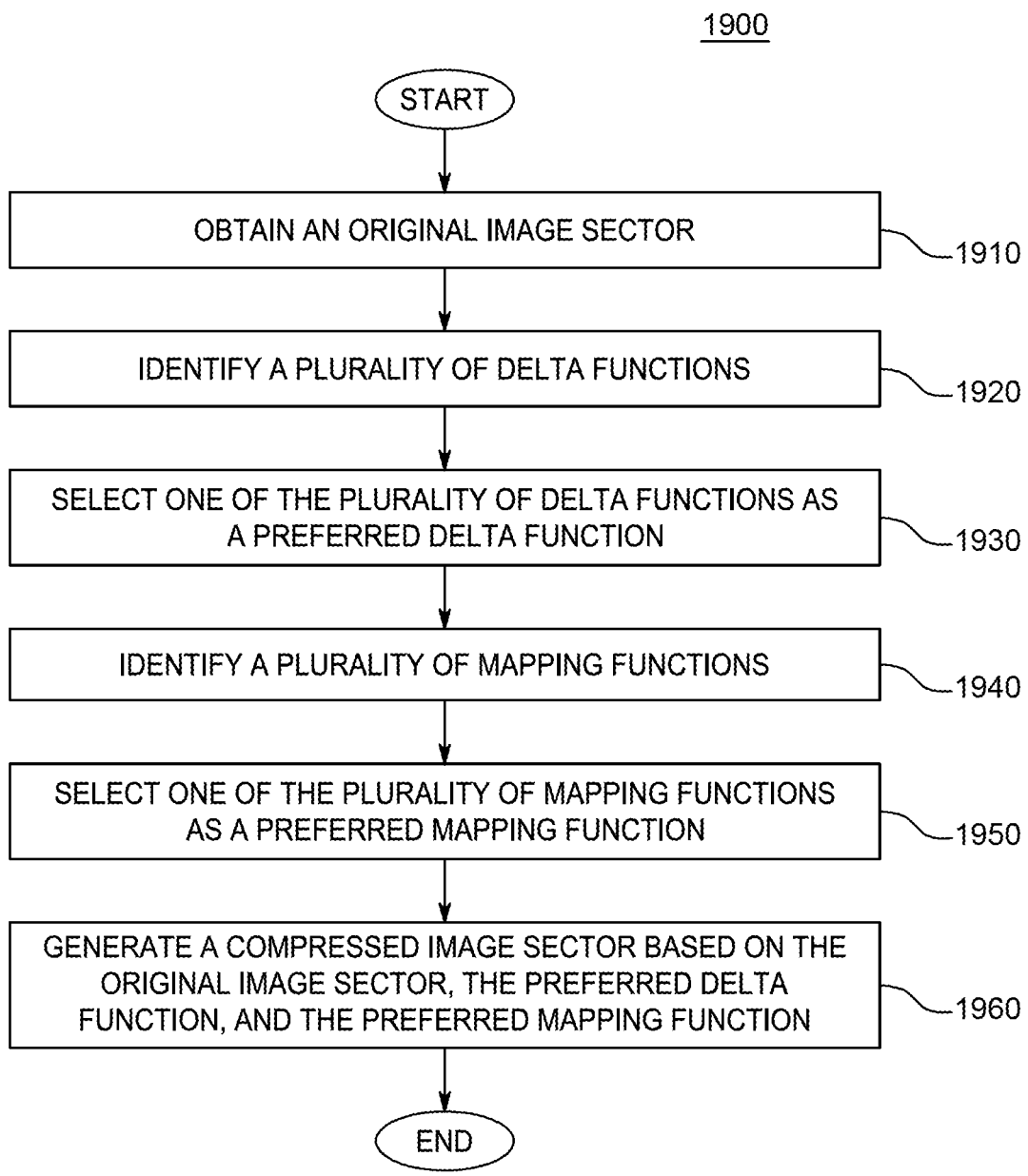
FIG. 19 is a flowchart of an example of a subprocess, associated with the process of FIG. 17, according to aspects of the disclosure.

FIG. 19 is a flowchart of an example process 1900 for compressing an image sector to produce a preferred compressed image sector, as discussed with respect to step 1830 of the process 1800. Unlike the process 1800, the process 1900 identifies the delta and mapping functions that are preferred for a given image sector without combining them in pairs first.

At step 1910, an original image sector is obtained.

At step 1920, a plurality of delta functions is identified.

At step 1930, one of the plurality of delta functions is selected as a preferred delta function for the pixelation pattern of the original image sector. In some implementations, identifying the preferred delta function includes: generating a plurality of delta-encoded image sectors, wherein each delta-encoded image sector is generated based on the original image sector and a different one of the plurality of mapping functions; identifying one of the delta-encoded image sectors as a preferred delta-encoded image sector; and selecting the delta function used to encode the preferred delta-encoded image sector as the preferred delta function. In some implementations, the preferred delta-encoded image sector is the image sector that satisfies a predetermined condition that is based on the number of zero delta values in the image sector. For example, the preferred delta-encoded image sector in the plurality of delta-encoded image sectors may be the sector which includes the largest number of zero delta values among the delta-encoded image sectors.

At step 1940, a plurality of mapping functions is identified.

At step 1950, one of the plurality of delta functions is selected as a preferred delta function for the pixelation pattern of the original image sector. In some implementations, identifying the preferred mapping function includes: generating a plurality of segregated image sectors, wherein each segregated image sector is generated based on the preferred delta-encoded image sector (identified at step 1920) and a different one of the plurality of delta functions; identifying one of the segregated image sectors as a preferred segregated image sector; and selecting the mapping function used to encode the preferred segregated image sector as the preferred mapping function. In some implementations, the preferred segregated image sector is the segregated image sector that satisfies a predetermined condition that is based on the degree of segregation between zero and non-zero delta values in the segregated image sector. For example, the preferred segregated image sector may be the sector that features the least uniform distribution of zero delta values (e.g., the segregated image sector that includes the largest number of zero delta values in its second portion) in the plurality of segregated image sectors. As another example, the preferred segregated image sector may be the sector that includes the largest number of segments that include only zero delta values in the plurality of segregated image sectors.

At step 1960, the preferred segregated image sector is compressed to produce a preferred compressed image sector.

In some implementations, the preferred image sector is compressed in the manner discussed with respect to FIG. 7.

It should be understood that many variations are possible based on the disclosure herein. Although features and elements are described above in particular combinations, each feature or element can be used alone without the other features and elements or in various combinations with or without other features and elements. It should further be understood that the term "image" may refer to any representation of visual content, such as a one-dimensional array of pixels, a two-dimensional array of pixels, a png file, a jpg file, and/or any other suitable type of object. It should further be understood that term "layer" may refer to any representation of one of several available channels in an image or image sector. For example, the term layer may refer to an array of values, wherein each value corresponds to the blue channel in an RGB-encoded image. Because any given layer in a color image (or color image sector) is monochromatic in nature, that layer may also be referred to as a monochromatic image (or monochromatic image sector). It should be further understood that term "sector" may refer to any representation of a portion of an image such as a one-dimensional array of pixels, a two-dimensional array of pixels, a png file, a jpg file, and/or any other suitable type of object. Any the processes described with respect to FIGS. 15, 16A, 18 and 19 can be applied to entire images as well, and not only to image sectors. As used throughout the disclosure, the term "processing circuitry" may refer to one or more of a processor (e.g., the processor 102), an accelerated processing device (e.g., the APD 116), a field programmable gate array (FPGA), an application-specific integrated circuit, a graphic processing unit (GPU), and/or any other suitable type of electronic circuitry.

The processes provided can be implemented in a general-purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

Although various examples throughout the disclosure are provided in the context of variable shading rate images, it will be understood to that the present disclosure is not limited only to this type of images. While the processes discussed above with respect to FIGS. 1-19 take advantage of pixel redundancies that are present in pixelated images, those processes can be used to compress any type of image, irrespective of whether any pixel redundancies are present. Although the disclosure lists the output merger stage and texture unit as example of stages in the graphics pipeline where the processes discussed with respect to FIGS. 1-19 can be implemented, it will be understood that those processes can be employed at any stage of a graphics pipeline where image compression is considered necessary or otherwise desirable.

The methods or flow charts provided herein can be implemented in a computer program, software, or firmware incorporated in a non-transitory computer-readable storage medium for execution by a general purpose computer or a processor. Examples of non-transitory computer-readable storage mediums include a read-only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for use in a processor for encoding an image, the method comprising:
    obtaining an original image;
    identifying one or more image sectors in the original image, wherein each of the one or more image sectors has a pixelation pattern;
    generating one or more compressed image sectors by compressing each image sector in the original image using at least one of a delta function and a mapping function selected based on the pixelation pattern of the image sector;
    generating a compressed image of the original image using the one or more compressed image sectors; and
    outputting the compressed image.

2. The method of claim 1, wherein the at least one of the delta function and the mapping function selected for compressing each image sector in the original image is selected based on at least one of a preferred delta function and a preferred mapping function for pixelation pattern of the sector.

3. The method of claim 1, wherein the delta function that is selected based on the pixelation pattern of the image sector is arranged to encode the image sector to produce a delta-encoded image sector in which all duplicative pixels in the image sector are assigned zero delta values.

4. The method of claim 3, wherein the mapping function that is selected based on the pixelation pattern of the image sector is arranged to encode the delta-encoded image sector to produce a segregated image sector in which all zero delta values are placed in one of a plurality of portions of the segregated image sector.

5. The method of claim 1, wherein the generating one or more compressed image sectors by compressing each image sector in the original image includes:
    identifying a plurality of delta functions and a plurality of mapping functions;
    generating a plurality of function pairs, each function pair including a delta function and a mapping function;
    compressing each image sector based on a different function pair; and
    selecting one of the plurality of compressed image sectors to generate a compressed image of the original image based on a compression metric.

6. The method of claim 1, wherein the generating one or more compressed image sectors by compressing each image sector in the original image includes:
    identifying a plurality of delta functions and a plurality of mapping functions;
    selecting a delta function from the plurality of delta functions;
    selecting a mapping function from the plurality of mapping functions; and
    compressing each image sector based on the selected delta function and the selected mapping function.

7. The method of claim 1, wherein the generating one or more compressed image sectors by compressing each image sector in the original image includes using the at least one of a delta function and a mapping function selected based on pixelation pattern of the image sector generates a delta-encoded image sector.

8. The method of claim 7, further comprising rearranging an order of delta values in the delta encoded image sector to generate a segregated image sector.

9. The method of claim 8, wherein the generating the compressed image of the original image using the one or more compressed image sectors includes compressing the segregated image sector.

10. The method of claim 1, further comprising decomposing each image sector into a plurality of layers, wherein the generating one or more compressed image sectors by compressing each image sector in the original image using at least one of a delta function and a mapping function selected based on the pixelation pattern of the image sector includes using the same delta function for all of the layers.

11. An apparatus, comprising:
a memory configured to store an original image; and
a processing circuitry operatively coupled to the memory configured to:
identify one or more image sectors in the original image, wherein each of the one or more image sectors has a pixelation pattern;
generate one or more compressed image sectors by compressing each image sector in the original image using at least one of a delta function and a mapping function selected based on the pixelation pattern of the image sector;
generate a compressed image of the original image using the one or more compressed image sectors; and
output the compressed image.

12. The apparatus of claim 11, wherein the at least one of the delta function and the mapping function selected for compressing each image sector in the original image is selected based on at least one of a preferred delta function and a preferred mapping function for pixelation pattern of the sector.

13. The apparatus of claim 11, wherein the delta function that is selected based on the pixelation pattern of the image sector is arranged to encode the image sector to produce a delta-encoded image sector in which all duplicative pixels in the image sector are assigned zero delta values.

14. The apparatus of claim 13, wherein the mapping function that is selected based on the pixelation pattern of the image sector is arranged to encode the delta-encoded image sector to produce a segregated image sector in which all zero delta values are placed in one of a plurality of portions of the segregated image sector.

15. The apparatus of claim 11, wherein the processing circuitry being configured to generate one or more compressed image sectors by compressing each image sector in the original image includes the processing circuitry being further configured to:
identify a plurality of delta functions and a plurality of mapping functions;
generate a plurality of function pairs, each function pair including a delta function and a mapping function;
compress each image sector based on a different function pair; and
select one of the plurality of compressed image sectors to generate a compressed image of the original image based on a compression metric.

16. The apparatus of claim 11, wherein the processing circuitry being configured to generate one or more compressed image sectors by compressing each image sector in the original image includes the processing circuitry being further configured to:
identify a plurality of delta functions and a plurality of mapping functions;
select a delta function from the plurality of delta functions;
select a mapping function from the plurality of mapping functions; and
compress each image sector based on the selected delta function and the selected mapping function.

17. The apparatus of claim 11, wherein the processing circuitry being configured to generate one or more compressed image sectors by compressing each image sector in the original image using the at least one of a delta function and a mapping function selected based on pixelation pattern of the image sector includes the processing circuitry being further configured to generate a delta-encoded image sector.

18. The apparatus of claim 17, wherein the processing circuitry is configured to rearrange an order of delta values in the delta encoded image sector to generate a segregated image sector.

19. The apparatus of claim 18, wherein the processing circuitry being configured to generate the compressed image of the original image using the one or more compressed image sectors includes the processing circuitry being further configured to compress the segregated image sector.

20. The apparatus of claim 11, wherein the processing circuitry is further configured to decompose each image sector into a plurality of layers, wherein the processing circuitry being configured to generate one or more compressed image sectors by compressing each image sector in the original image using at least one of a delta function and a mapping function selected based on the pixelation pattern of the image sector includes using the same delta function for all of the layers.

* * * * *